US008817299B2

(12) United States Patent
Wige

(10) Patent No.: US 8,817,299 B2
(45) Date of Patent: Aug. 26, 2014

(54) METHODS AND APPARATUS FOR AUTOMATIC HOSTNAME GENERATION

(75) Inventor: Russell Alan Wige, Las Vegas, NV (US)

(73) Assignee: TransAct Technologies Incorporated, Hamden, CT (US)

( * ) Notice: Subject to any disclaimer, the term of this patent is extended or adjusted under 35 U.S.C. 154(b) by 614 days.

(21) Appl. No.: 13/065,311

(22) Filed: Mar. 18, 2011

(65) Prior Publication Data

US 2011/0235116 A1 Sep. 29, 2011

Related U.S. Application Data

(60) Provisional application No. 61/316,443, filed on Mar. 23, 2010.

(51) Int. Cl.
*G06F 3/12* (2006.01)

(52) U.S. Cl.
USPC ............................................ 358/1.15; 902/23

(58) Field of Classification Search
USPC ............... 358/1.15; 710/2, 3, 9, 15, 104, 268; 902/23
See application file for complete search history.

(56) References Cited

U.S. PATENT DOCUMENTS

| | | | | |
|---|---|---|---|---|
| 7,111,100 | B2 * | 9/2006 | Ellerbrock | 710/300 |
| 2009/0248841 | A1 * | 10/2009 | Tjandra et al. | 709/220 |
| 2009/0307068 | A1 * | 12/2009 | Meyerhofer | 705/14.12 |

* cited by examiner

*Primary Examiner* — Thomas Lett
(74) *Attorney, Agent, or Firm* — Lipsitz & McAllister, LLC

(57) ABSTRACT

Methods and apparatus for automatic generation of a hostname for a network printer embedded in or associated with a gaming machine are provided. An identification number is received at the printer from the gaming machine. The printer can then generate a unique Hostname for the printer by modifying the identification number. Once the Hostname is generated, the printer is able to connect to the network using the generated Hostname. For example, a connection of the printer to the network may be delayed after initial power up of the printer until print data for a game generated ticket has been received at the printer from the gaming machine. The identification number may be extracted from the print data at the printer and used to generate the Hostname.

26 Claims, 3 Drawing Sheets

METHODS AND APPARATUS FOR AUTOMATIC HOSTNAME GENERATION

This application claims the benefit of U.S. provisional application No. 61/316,443 filed on Mar. 23, 2010, which is incorporated herein and made a part hereof by reference

BACKGROUND OF THE INVENTION

The present invention relates to the field of device networking. More specifically, the present invention relates to methods and apparatus for automatic generation of hostnames for network devices.

Devices connected to a network are typically indentified by a unique IP (Internet Protocol) address. This address maybe pre-assigned to the device (Static IP). More commonly, an address may be obtained from a host computer when the device is connected to the network using a DHCP (Dynamic Host Configuration Protocol) or similar protocol. When using DHCP, the IP address is leased and has the potential to be reassigned to a different networked device. Therefore an IP address cannot be relied on to identify a specific device on a network.

To solve this problem many networks implement a Domain Name System (DNS) or Dynamic Domain Name System (DDNS) which associates a unique name obtained from the device (Hostname) with its assigned IP address. If a device is assigned a different IP address, the DNS will recognize the device Hostname and associate the new IP address with that Hostname. Applications wishing to access the device can use the Hostname rather than the device's IP address. The DNS performs a translation using the Hostname to find the appropriate IP address. In a network with multiple devices, each device must be configured with a unique Hostname to prevent conflicts in the DNS.

On the floor of a casino or other gaming establishment, each gaming machine is configured with a unique identification number (e.g., an Asset Number, a machine number, and the like). Each gaming machine may be connected to a network using DCHP and DNS/DDNS as described above (or other network topologies such as RS-485 or the like). Each game also contains an embedded printer used to print tickets containing cash vouchers, such as Cashout vouchers, Jackpot vouchers, etc. As part of the printing operation, the game's unique Identification Number is printed on the ticket.

Casinos and other gaming establishments have also implemented promotional systems linked to the gaming machines. Some implementations of promotional systems require a second printer communications interface connected to a network such that the promotional programs for all machines can be controlled from a central location (e.g., a promotional server). This interface may be used to print promotional coupons based on game play or other criteria. In such systems, each printer network address must be associated with a specific game at the promotional server to ensure the promotional coupon is printed at the correct game location/printer. This can be accomplished using DHCP and DNS/DDNS or other protocol as described above.

A problem with the foregoing scheme is that the printer does not contain an HMI (Human Machine Interface) that can be used to enter an appropriate Hostname which associates the printer with the specific gaming machine it is associated with or embedded in. One method of configuring the printer would be to connect each printer to a configuration software tool which could be used to manually load a Hostname in each printer.

However, such a solution is problematic as it would require onsite labor to manually configure each printer.

It would be advantageous to provide methods and apparatus for automatically generating a hostname for a gaming machine printer (or another device associated with a networked device) and configuring the printer or other device with the automatically generated hostname. The generated Hostname could be based in part on the unique Identification Number obtained from the game to create an identifying association between the game and the networked device.

The methods and apparatus of the present invention provide the foregoing and other advantages.

SUMMARY OF THE INVENTION

The present invention relates to methods and apparatus for automatic generation of hostnames for network devices.

In one example embodiment of the present invention, a method is provided for automatic generation of a hostname for a network printer embedded in or associated with a gaming machine. In such a method, an identification number for the gaming machine is received at the printer. The printer can then generate a unique Hostname for the printer by modifying the identification number. Once the Hostname is generated, the printer is able to connect to the network using the generated Hostname.

In one example embodiment, a query may be sent from the printer to the gaming machine to obtain the identification number.

In a further example embodiment, the connection of the printer to the network may be delayed after initial power up of the printer until print data for a game generated ticket has been received at the printer from the gaming machine. The identification number can then be extracted from the print data at the printer and used to generate the Hostname.

The method may further comprise storing a default Hostname in the printer. The default Hostname may be assigned to the printer after a timeout period in which no print data is received by the printer from the gaming machine. Alternatively, after a timeout period in which no print data is received by the printer from the gaming machine, a query may be sent from the printer to the gaming machine to obtain the identification number.

The modifying of the identification number to generate the unique Hostname may comprise adding an additional prefix or suffix to the identification number. The additional prefix or suffix may be based on printer specific information. The printer specific information may comprise at least one of a model designation, a port identification, a serial number, a printer name, a printer identification, or the like.

The Hostname may identify a network port of the printer. The network port may be a promotional network interface port used for connection to a promotional server adapted to generate promotional coupons to be printed at the printer.

An identification number change notification containing a new identification number may be received at the network port and a new Hostname may then be generated based on the new identification number.

In a further example embodiment, a network adapter may be provided which is in communication with the printer. The network adapter comprises the network port and memory. In such an embodiment, the identification number may be stored in memory at the printer and in memory at the network adapter. After each power up of at least one of the printer or the network adapter, the printer and network adapter may compare the respective identification numbers stored at the printer and at the network adapter. If the respective identification numbers match, the Hostname is valid. If the respective identification numbers do not match, the Hostname is invalid and the network port will not be allowed to connect to the network.

In the event of an invalid Hostname, a new Hostname may be generated upon receipt of print data for a game generated ticket at the printer. The identification number may be extracted from the print data at the printer and modified to create the Hostname. Alternatively, in the event of an invalid Hostname, the printer may query the gaming machine for the identification number, which is modified to create the Hostname once received as discussed above.

The present invention also includes apparatus corresponding to the above-described methods. An example embodiment of such an apparatus is a network printer apparatus capable of automatic generation of a hostname. The network printer apparatus comprises a network port, a gaming machine interface port, and a processor. An identification number for the gaming machine is received at the printer. For example, the identification number may be received from the gaming machine via the gaming machine interface port. The processor generates a unique Hostname for the printer by modifying the identification number. The network port is then connected to the network using the generated Hostname.

In one example embodiment, a query may be sent from the printer to the gaming machine to obtain the identification number.

In a further example embodiment, the connection of the printer to the network may be delayed after initial power up of the printer until print data for a game generated ticket has been received at the printer from the gaming machine. The processor may then extract the identification number from the print data provided by the gaming machine and use the extracted identification number to generate the Hostname.

In a further example embodiment, the network printer apparatus may further comprise printer memory for storing a default Hostname in the printer. In such an example embodiment, the default Hostname may be assigned to the printer after a timeout period in which no print data is received by the printer from the gaming machine. Alternatively, after a timeout period in which no print data is received by the printer from the gaming machine, a query may be sent from the printer to the gaming machine to obtain the identification number.

The modifying of the identification number to generate the unique Hostname may comprise adding an additional prefix or suffix to the identification number. The additional prefix or suffix may be based on printer specific information. The printer specific information may comprise at least one of a model designation, a port identification, a serial number, a printer name, a printer identification.

The Hostname may identify the network port of the printer. The network port may be a promotional network interface port used for connection to a promotional server adapted to generate promotional coupons to be printed at the printer.

An identification number change notification containing a new identification number may be received at the network port. A new Hostname based on the new identification number may then be generated by the processor.

In a further example embodiment of a network printer apparatus in accordance with the present invention, memory may be provided for storing the identification number at the printer. In addition, a network adapter may be provided which comprises the network port and memory for storing the identification number at the network adapter. Respective network adapter interfaces may be provided at the printer and the network adapter, enabling communications between the printer and the network adapter. In such an example embodiment, after each power up of at least one of the printer or the network adapter, the printer and network adapter may compare the respective identification numbers stored at the printer and at the network adapter. If the respective identification numbers match, the Hostname is valid. If the respective identification numbers do not match, the Hostname is invalid and the network port will not be allowed to connect to the network.

In the event of an invalid Hostname, a new Hostname may be generated upon receipt of print data for a game generated ticket at the printer. The identification number may be extracted from the print data at the printer and modified to create the Hostname. Alternatively, in the event of an invalid Hostname, the printer may query the gaming machine for the identification number, which is modified to create the Hostname once received as discussed above.

BRIEF DESCRIPTION OF THE DRAWINGS

The present invention will hereinafter be described in conjunction with the appended drawing figures, wherein like reference numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

The present invention relates to methods and apparatus for automatic generation of hostnames for network devices. The present invention is described below in connection with a network printer embedded in or associated with a gaming machine.

Figure 1:
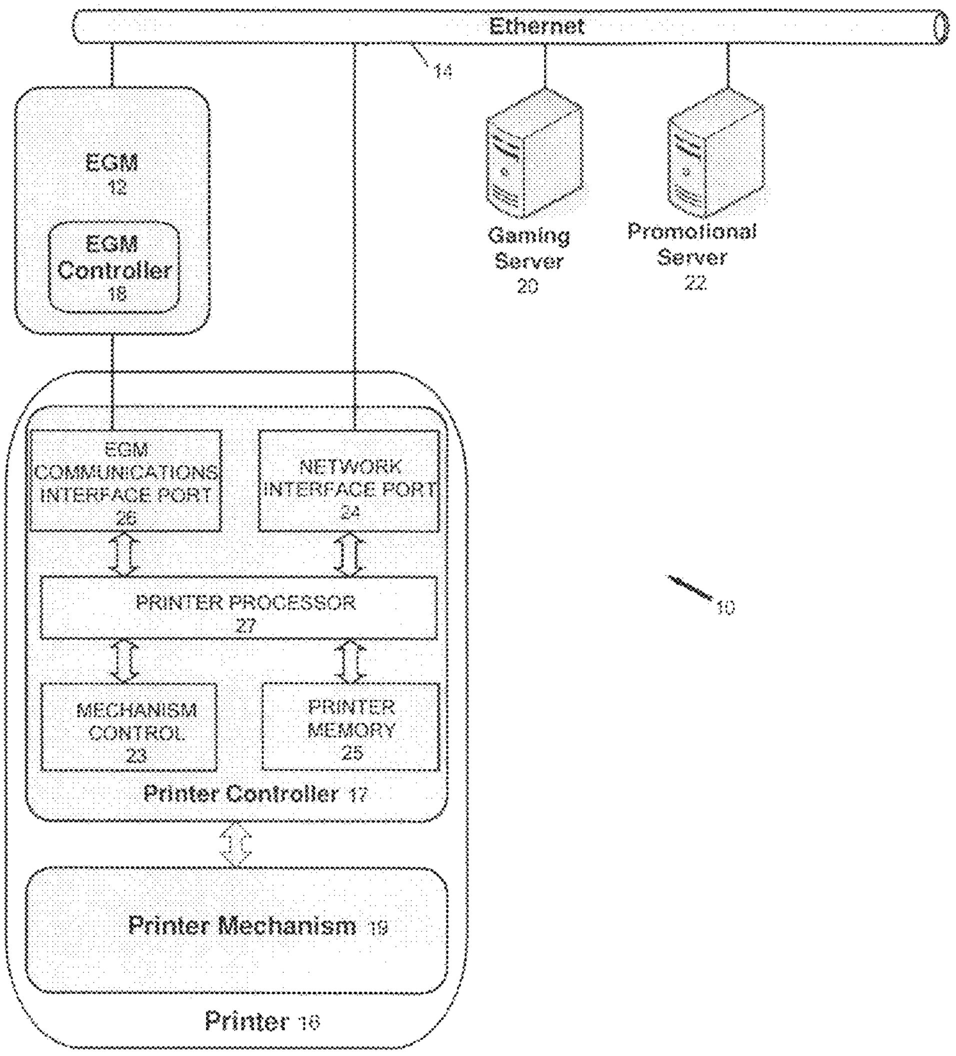
FIG. 1 shows a block diagram of an example embodiment of the present invention.

FIG. 1 shows a networked gaming machine environment 10 in accordance with an example embodiment of the present invention. Electronic gaming machine 12 (EGM) is connected to a network 14. It should be appreciated that only one gaming machine 12 is shown in the Figures for simplicity, but that a typical gaming machine environment will have multiple gaming machines 12 connected on the network 14. Each gaming machine 12 may comprise a ticket printer 16 embedded therein or associated therewith and an EGM controller 18 (sometimes referred to as a local controller). The printer 16 may comprise a printer controller 17 and a printer mechanism 19. The printer mechanism 19 may be controlled by the mechanism control 23 of the printer controller 17. The printer 16 is connected to the network 14 via a network interface port 24 and to the EGM controller 18 of the EGM 12 via an EGM communications interface port 26. The printer 16 may be a dual port printer as described, for example, in U.S. Pat. No. 6,924,903 and its related family of patents.

The gaming machines 12 may be controlled, or at least partially controlled, by a Gaming Server 20 (sometimes referred to as a Central System Controller (CSC)) via the network 14. Promotional programs may be implemented via a promotional server 22 associated with the gaming server 20 on the network 14. For example, the gaming server 20 and/or the promotional server 22 may control the printing of promotional coupons by each gaming machine printer 16. The gaming server 20 may be situated at the same location as the gaming machines 12, or may be remotely located. Similarly, the promotional server 22 may be situated at the same location as the gaming machines 12, or may be remotely located. The gaming server 20 and the promotional server 22 may be in the same or different locations. A remotely located gaming server 20 and/or promotional server 22 may service different gaming machine populations at a plurality of facilities (such as different casinos, racetracks, retail lottery establishments, etc.).

Each gaming machine 12 is assigned a unique identification number, such as an Asset Number, a machine number, a static IP number, or other type of unique identifier as would be appreciated by those of ordinary skill in the art. The identification number identifies each gaming machine 12 on the network 14 to the Gaming Server 20 and the promotional server 22.

When the gaming machine printer 16 prints a cash voucher (which is typically under the local control of the gaming machine controller 18), the gaming machine 12 provides its associated printer 16 with the gaming machine's identification number. The identification number can also be obtained by the printer in a variety of other ways. The automatic generation of a unique Hostname of the present invention is based in part on the use of the unique identification number assigned to the particular gaming machine 12 that the printer 16 is embedded in or otherwise associated with.

In one example embodiment of the present invention as shown in FIG. 1, the Hostname may be automatically generated by the printer 16. The identification number for the gaming machine may be received at the printer 16. For example, the identification number may be received from the gaming machine 12 via the EGM port 26. This Identification Number will then be modified by the printer 16 to generate a unique Hostname for the printer. The printer 16 can then connect to the network 14 using the generated Hostname.

In one example embodiment, a query may be sent from the printer 16 to the gaming machine 12 to obtain the identification number (e.g., via the EGM port 26). The query may be sent to the gaming machine 12 via the EGM interface port 26. Gaming machines such as EGM 12 typically have more than one interface. For example, an additional interface and protocol may be provided for connecting to a Slot Machine Interface Board or SMIB that in turn connects to the backend system for collecting meters as well as performing other tasks like Ticket-In, Ticket-Out (TITO) processing. Most EGM's provide more than one of these interfaces and the most common protocol exposed on such an interface is a Slot Accounting System (SAS) protocol. Sometimes other devices are connected to these additional SAS interfaces like a progressive controller board that links a bank of games that all contribute to a progressive Jackpot meter. Thus, those skilled in the art will appreciate that EGM interface port 26 may be the standard printer interface or may denote another gaming machine interface such as an SAS interface port or other additional port on the gaming machine 12. Thus, although only a single connection between the printer 16 and the gaming machine 12 is shown in the Figures, the printer 12 may have the standard printer port that is connected to the EGM 12 for receipt of print data, as well as a further port connected to the SAS or other port of the gaming machine 12 via an SAS or other corresponding protocol.

In a further example embodiment, after each power up, the printer 16 may delay its connection to the network 14 until a game generated ticket (cash voucher) has been printed (or until print data for a game generated ticket is received at the printer 16 from the gaming machine controller 18). When this ticket is printed (or when the print data is received), the printer controller 17 will extract the Identification Number from the ticket data stream. The extracted identification number may then be modified to create the Hostname.

Optionally, a default Hostname may be stored in the printer (e.g., in memory 25). The default Hostname may be assigned to the printer after a timeout period after initial start up in which no print data is received by the printer from the gaming machine 12. The printer 16 will then connect to the network 14 using the default Hostname. Alternatively, after a timeout period in which no print data is received by the printer 16 from the gaming machine 12, a query may be sent from the printer 16 to the gaming machine 12 to obtain the identification number.

Since a cash voucher is typically printed under local control from the gaming machine controller 18, the printer 16 will typically not need to connect to the gaming server 20 or the promotional server 22 immediately upon startup. Therefore, a delay in the printer 16 connecting to the gaming server 20 or the promotional server 22 over the network 14 until the first cash voucher is printed out is acceptable in most circumstances. The timeout period may be implemented to ensure that the printer 16 eventually connects to the network 14 so that promotional coupons can be printed if, for example, game play continues for an extended time period without a cash award.

The modifying of the identification number to generate the Hostname may be carried out by the printer processor 27 in connection with mechanism control 23 and printer memory 25. The modifying of the identification number to generate the unique Hostname may comprise adding an additional prefix or suffix to the identification number. The additional prefix or suffix may be based on printer specific information. The printer specific information may comprise at least one of a model designation, a port identification, a serial number, a printer name, a printer identification, or the like.

Once the printer is connected to the network using the generated Hostname or the default Hostname, the promotional server 22 (and/or the gaming server 20) can then discern the printer's location by extracting the Identification Number from the Hostname returned during the connection process.

The Hostname may identify a network interface port 24 of the printer. The network port 24 may be a promotional network interface port used for connection to a promotional server 22 adapted to generate promotional coupons to be printed at the printer 16.

An identification number change notification containing a new identification number may be received at the network interface port 24 and a new Hostname may then be generated based on the new identification number. The change notification may come from the promotional server 22 or the gaming server 20 (or any other network server or device capable of accessing a configuration management page in the printer 16).

Figure 2:
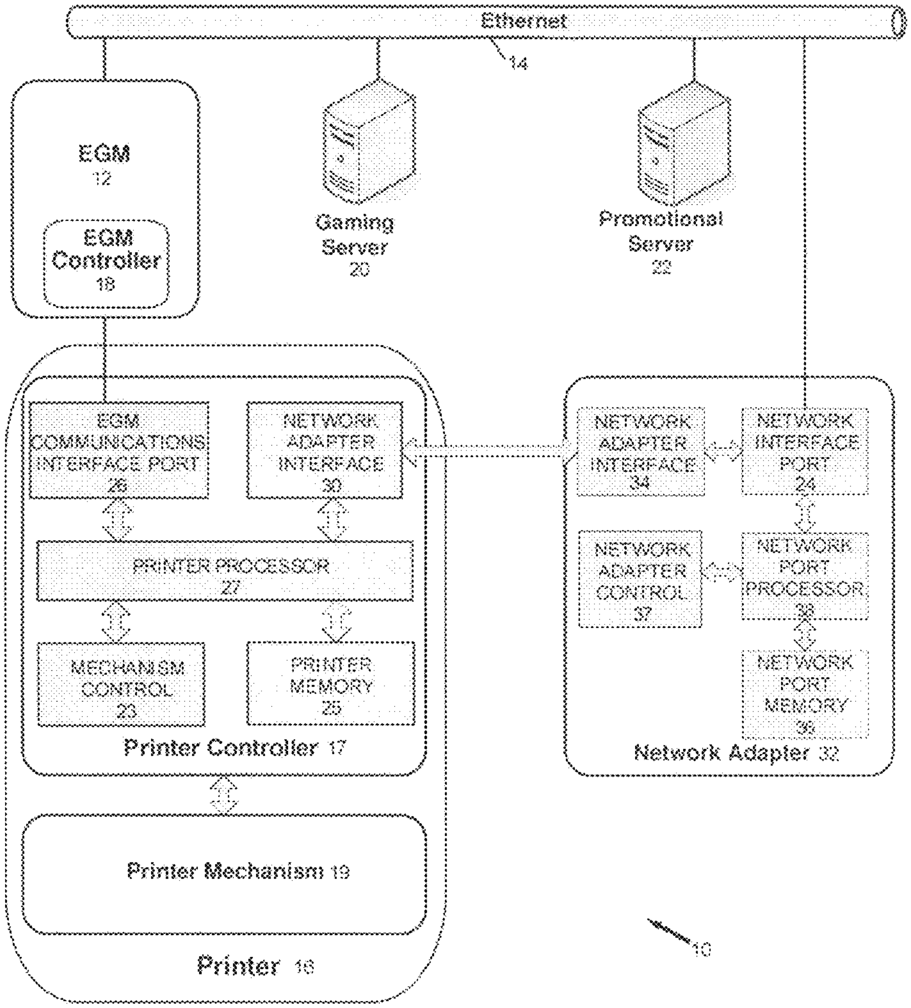
FIG. 2 shows a block diagram of a further example embodiment of the present invention.

FIG. 2 shows a further example embodiment of the present invention in which the network interface port 24 is disposed in a network adapter 32. The network adapter 32 may be connected to or separate from the printer 16. The network adapter 32 is under the control of network adapter control 37, which may include software and/or firmware for controlling the functionality of network adapter 32. The printer 16 and network adapter 32 are in communication with each other via network adapter interfaces 30 and 34 located at the printer 16 and network adapter 32, respectively. In such an embodiment, the printer 16 and the network adapter 32 can be replaced (swapped out) independent of each other. In the example embodiment shown in FIG. 2, the unique Hostname is generated similarly to that discussed above in connection with FIG. 1. However, the identification number may be stored in printer memory 25 at printer 16 and in network port memory 36 at network adapter 32. Printer memory 25 and network port memory 36 may comprise non-volatile memory. In such an example embodiment, after each power up of at least one of the printer 16 or the network adapter 32, the printer 16 and network adapter 32 may compare the respective identification numbers stored at the printer and at the network adapter. If the respective identification numbers match, the Hostname is valid and the network interface port 24 may immediately connected to the network 14 without waiting for a first game ticket to be generated by the gaming machine 12. If the respective identification numbers do not match, the Hostname is invalid and the network interface port 24 will not be allowed to connect to the network 14. The stored values are cleared from printer memory 25 and network port memory 36 and either a default Hostname is used or a new Hostname is generated based on the unique identification number as discussed above once the first game generated ticket is printed subsequent to power up of the printer 16.

For example, in the event of an invalid Hostname, a new Hostname may be generated upon receipt of print data for a game generated ticket at the printer 16. The identification number may be extracted from the print data at the printer 16 and modified to create the Hostname as discussed above. Alternatively, in the event of an invalid Hostname, the printer 16 may query the gaming machine 12 for the identification number, which may then be modified to create the Hostname once received, as discussed above.

Similarly, the identification numbers stored in the printer 16 and the network adapter 32 may be compared after a first game ticket is printed after power up of the printer 16: if the identification numbers match, the Hostname remains unchanged; and if the identification numbers do not match, the nonvolatile memory 25 of the printer 16 and the nonvolatile memory 36 of the network adapter 32 are updated with a new Hostname configured as discussed above.

The foregoing embodiment avoids the need to create a new Hostname every time a machine is powered down or after a power outage. It should be appreciated that when servicing or installing a printer 16 embedded in or associated with a gaming machine 12, the printer 16 and promotional network interface port 24 should not be swapped or installed as a pair. Further, after swapping out a printer 16 or a network adapter 32, it may be advantageous to print out an initial gaming ticket before putting the gaming machine 12 back in service, so that the Hostname can be configured. The identification numbers can be stored in nonvolatile memory 25 of the printer 16 and the nonvolatile memory 36 of the network adapter 32 at this juncture (or provided with default numbers from the factory, in which the comparison between the numbers stored at the printer 16 and the network adapter 32 will lead to configuration or reconfiguration of the Hostname as described above). For example, in the event of an initial installation or replacement of the printer 16 or network adapter 32 of FIG. 2, the installer would print a game generated ticket (cash voucher). The printer 16 would extract and save the Identification Number in nonvolatile memory 25 and notify the network adapter 32 that the Identification Number has changed. When the network adapter 32 receives an Identification Number change notification with a new identification number, it saves the new Identification Number in memory 36 and uses the information to generate a new Hostname. The network interface port 24 will then connect to the network 14 using the newly generated Hostname.

Figure 3:
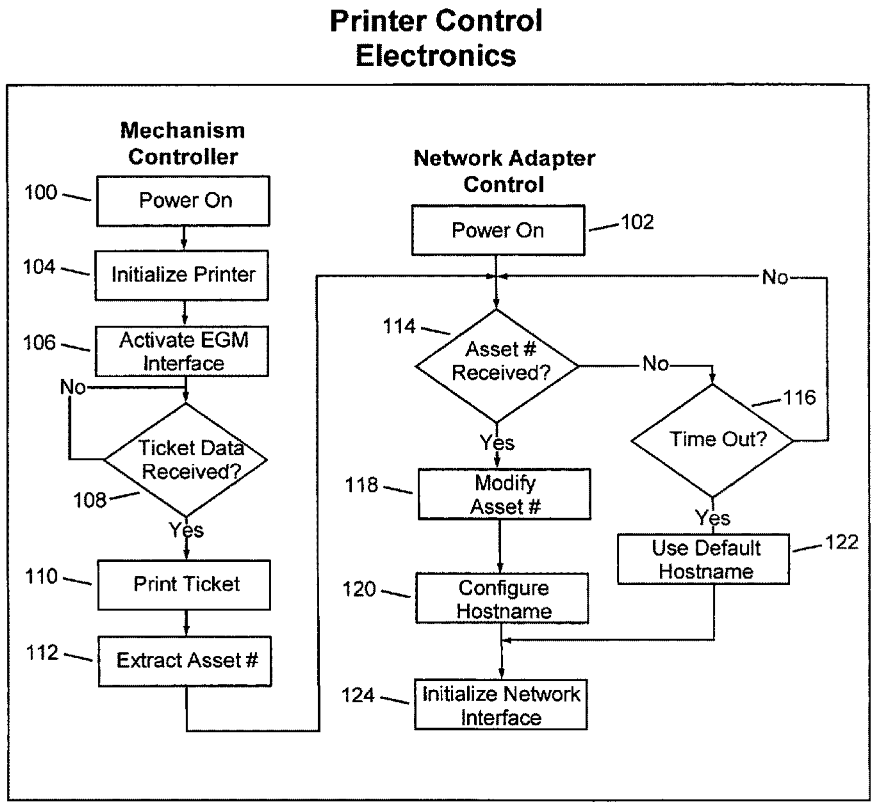
FIG. 3 is a flowchart illustrating an example embodiment of a method in accordance with the present invention.

The present invention may be implemented using software, for example, running on: (1) the mechanism control 23 and processor 27 of FIG. 1; or (2) on both the mechanism control 23 and processor 27 of the printer 16 and the network adapter control 37 and network port processor 38 of the network adapter 32 of FIG. 2. FIG. 3 shows a flowchart of an example embodiment of the present invention, showing the steps carried out by the printer/network adapter electronics described above in connection with FIG. 2. When the printer 16 is powered on, the mechanism control 23 and the network adapter control 37 are powered on (100 and 102). After the mechanism control 23 is powered on, the printer is initialized (104) and the EGM communications interface port 26 is activated (106). A check (108) is then implemented to determined when print data for a cash ticket (voucher) is received. If print data is not received, the check (108) is repeated. Once print data is received, the ticket is printed (110) and the identification number is extracted from the print data (112). When the network adapter control 37 is powered on (102), a check (114) is performed to see if the identification number has been extracted and received. If the identification number has not been received, the check (114) is repeated as long as the time period from start up (102) does not exceed a timeout period (116). Once the identification number is received, the identification number is modified with printer specific information (118) and a unique Hostname is configured for the printer (120). If the identification number is not received within the timeout period (116), a default Hostname is obtained from printer memory 25 (or network port memory 36) and configured as the printer Hostname (122). Once the printer 16 has been configured with either the unique Hostname based on the identification number or the stored default Hostname, the network interface port 24 is initialized and the printer 16 is connected to the network 14 (124).

The present invention is particularly applicable to gaming machines and printers associated therewith. However, those skilled in the art will appreciate that the present invention can be applied to various types of dual port devices associated with network devices on one port and also with the network on another port, provided that the network implements a domain name system which associates a unique name obtained from the device with its assigned IP address. For example, the present invention can be utilized with printers embedded in automatic teller machines (ATMs) or similar devices where the printer may have a direct network connection as well as a connection to the ATM or other device.

It should now be appreciated that the present invention provides advantageous methods and apparatus for automatically generating hostnames for network devices such as printers embedded within or associated with networked gaming machines.

Although the invention has been described in connection with various illustrated embodiments, numerous modifications and adaptations may be made thereto without departing from the spirit and scope of the invention as set forth in the claims.

What is claimed is:

1. A method for automatic generation of a hostname for a network printer embedded in or associated with a gaming machine, comprising:

receiving an identification number for the gaming machine at the printer;

generating at the printer a unique Hostname for the printer by modifying the identification number;

connecting the printer to a network using the generated Hostname;

wherein the Hostname identifies a network port of the printer.

2. A method in accordance with claim 1, further comprising:

sending a query from the printer to the gaming machine to obtain the identification number.

3. A method in accordance with claim 1, further comprising:

delaying the connection of the printer to the network after initial power up of the printer until print data for a game generated ticket has been received at the printer from the gaming machine;

extracting the identification number at the printer from the print data.

4. A method in accordance with claim 3, further comprising:

after a timeout period in which no print data is received by the printer from the gaming machine, sending a query from the printer to the gaming machine to obtain the identification number.

5. A method in accordance with claim 3, further comprising:

storing a default Hostname in the printer;

assigning the default Hostname to the printer after a timeout period in which no print data is received by the printer from the gaming machine.

6. A method in accordance with claim 1, wherein the modifying of the identification number to generate the unique Hostname comprises adding an additional prefix or suffix to the identification number.

7. A method in accordance with claim 6, wherein the additional prefix or suffix is based on printer specific information.

8. A method in accordance with claim 7, wherein said printer specific information comprises at least one of a model designation, a port identification, a serial number, a printer name, a printer identification.

9. A method in accordance with claim 1, wherein:

the network port is a promotional network interface port used for connection to a promotional server adapted to generate promotional coupons to be printed at the printer.

10. A method in accordance with claim 1, further comprising:

receiving an identification number change notification containing a new identification number at the network port;

generating a new Hostname based on the new identification number.

11. A method in accordance with claim 1, further comprising:

providing a network adapter in communication with the printer which comprises the network port and memory;

storing the identification number in memory at the printer and in memory at the network port, wherein:

after each power up of at least one of the printer or the network adapter, the printer and network adapter compare the respective identification numbers stored at the printer and at the network adapter;

if the respective identification numbers match, the Hostname is valid;

if the respective identification numbers do not match, the Hostname is invalid and the network port will not be allowed to connect to the network.

12. A method in accordance with claim 11, wherein:

in the event of an invalid Hostname, a new Hostname will be generated upon receipt of print data for a game generated ticket at the printer; and the identification number being extracted from the print data at the printer and modified to create the new Hostname.

13. A method in accordance with claim 11, wherein:

in the event of an invalid Hostname, the printer queries the gaming machine for the identification number; and the identification number is modified to create the new Hostname once received at the printer.

14. Network printer apparatus capable of automatic generation of a hostname, comprising:

a network port;

a gaming machine interface port; and a processor;

wherein:

an identification number for the gaming machine is received at the printer via the gaming machine interface port;

the processor generates a unique Hostname for the printer by modifying the identification number;

the network port is connected to the network using the generated Hostname; and the Hostname identifies the network port of the printer.

15. A network printer apparatus in accordance with claim 14, wherein:

a query is sent from the printer to the gaming machine to obtain the identification number.

16. A network printer apparatus in accordance with claim 14, wherein:

the connection of the printer to the network is delayed after initial power up of the printer until print data for a game generated ticket has been received at the printer from the gaming machine;

the processor extracts the identification number from the print data provided by the gaming machine.

17. A network printer apparatus in accordance with claim 16, wherein:

after a timeout period in which no print data is received by the printer from the gaming machine, a query is sent from the printer to the gaming machine to obtain the identification number.

18. A network printer apparatus in accordance with claim 16, further comprising:

printer memory for storing a default Hostname in the printer;

wherein the default Hostname is assigned to the printer after a timeout period in which no print data is received by the printer from the gaming machine.

19. A network printer apparatus in accordance with claim 14, wherein the modifying of the identification number to generate the unique Hostname comprises adding an additional prefix or suffix to the identification number.

20. A network printer apparatus in accordance with claim 19, wherein the additional prefix or suffix is based on printer specific information.

21. A network printer apparatus in accordance with claim 20, wherein said printer specific information comprises at least one of a model designation, a port identification, a serial number, a printer name, a printer identification.

22. A network printer apparatus in accordance with claim 14, wherein:

the network port is a promotional network interface port used for connection to a promotional server adapted to generate promotional coupons to be printed at the printer.

23. A network printer apparatus in accordance with claim 14, wherein:

an identification number change notification containing a new identification number is received at the network port;

a new Hostname based on the new identification number is generated by the processor.

24. A network printer apparatus in accordance with claim 14, further comprising:

memory for storing the identification number at the printer; and a network adapter comprising:

the network port; and memory for storing the identification number at the network adapter; and respective network adapter interfaces at the printer and the network adapter, enabling communications between the printer and the network adapter, wherein:

after each power up of at least one of the printer or the network adapter, the printer and network adapter compare the respective identification numbers stored at the printer and at the network adapter;

if the respective identification numbers match, the Hostname is valid;

if the respective identification numbers do not match, the Hostname is invalid and the network port will not be allowed to connect to the network.

25. A network printer apparatus in accordance with claim 24, wherein:

in the event of an invalid Hostname, a new Hostname will be generated upon receipt of print data for a game generated ticket at the printer; and the identification number being extracted from the print data at the printer.

26. A network printer apparatus in accordance with claim 24, wherein:

in the event of an invalid Hostname, the printer queries the gaming machine for the identification number; and the identification number is modified to create the new Hostname once received at the printer.

* * * * *